United States Patent
Iwasaki et al.

(10) Patent No.: US 6,787,183 B2
(45) Date of Patent: Sep. 7, 2004

(54) METHOD OF AND APPARATUS FOR PRODUCING ELECTRODE OF FUEL CELL

(75) Inventors: Kazuhiko Iwasaki, Hiki-gun (JP); Noboru Okada, Saitama (JP); Ichiro Tanaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/256,630

(22) Filed: Sep. 27, 2002

(65) Prior Publication Data

US 2003/0060356 A1 Mar. 27, 2003

(30) Foreign Application Priority Data

Sep. 27, 2001 (JP) ........................ 2001-298003

(51) Int. Cl.[7] .............................. B05D 5/12; B05D 1/36; B05D 3/02
(52) U.S. Cl. .................. 427/115; 427/458; 427/372.2; 427/402
(58) Field of Search ................................ 427/115, 458, 427/372.2, 282, 402

(56) References Cited

U.S. PATENT DOCUMENTS

| 3,912,538 A | * 10/1975 | Dews et al. .................. 429/44 |
| 5,525,436 A | 6/1996 | Savinell et al. ............... 429/30 |
| 5,753,132 A | * 5/1998 | Shamouilian et al. ......... 216/33 |

FOREIGN PATENT DOCUMENTS

JP 09-180728 A 7/1997

* cited by examiner

Primary Examiner—Michael Barr
(74) Attorney, Agent, or Firm—Lahive & Cockfield, LLP; Anthony L. Laurentano

(57) ABSTRACT

An electrode base material is held by electrostatic attraction when a voltage from a DC power source is applied to electrodes for electrostatic attraction. A paste is applied to the electrode base material, and then the paste is dried to form the water-repellent layer. Subsequently, another paste is applied to the water-repellent layer, and then the paste is dried. Accordingly, the substantially flat electrode catalyst layer including an extremely small number of depressions is formed. The electrode of the fuel cell produced as described above can be used as an anode or a cathode.

11 Claims, 11 Drawing Sheets

METHOD OF AND APPARATUS FOR PRODUCING ELECTRODE OF FUEL CELL

BACKGROUND OF THE INVENTION

1. Field of the Invention

The present invention relates to a method of and an apparatus for producing an electrode of a fuel cell. The output of the fuel cell with the electrode is high even when current density is high.

2. Description of the Related Art

In general, a fuel cell comprises a stack including a predetermined number of cell units which are electrically connected in series to one another. A collector is electrically connected to each of the cell units which are disposed at both ends of the stack. Further, an end plate is arranged outside of each of the collectors with an insulating plate interposed between the end plate and the collector to avoid electric leakage. Additionally, a backup plate may be arranged outside of each of the end plates in some cases. The stack, the insulating plates, and the collectors are interposed between the end plates or between the backup plates connected to each other by tie rods or the like.

The cell unit has an electrolyte electrode assembly 1 as shown in FIG. 8. The electrolyte electrode assembly 1 comprises an anode 2 and a cathode 3 which are connected to end surfaces of an electrolyte layer 4 respectively.

In this arrangement, the anode 2 comprises a water-repellent layer 6a and an electrode catalyst layer 7a which are stacked in order of mention on an electrode base material 5a. In general, the electrode base material 5a is made of carbon paper, carbon cloth, or the like. The water-repellent layer 6a is made of carbon black and polytetrafluoroethylene (PTFE). The electrode catalyst layer 7a is made of carbon black with Pt supported thereon. On the other hand, the cathode 3 is constructed in the same manner as the anode 2. Therefore, the constitutive elements of cathode 3 are denoted by reference symbols of the elements of the anode 2 but replacing "a" with "b", and detailed explanation thereof is omitted.

The electrolyte layer 4 comprises a membrane 8 impregnated with a liquid electrolyte. The membrane 8 may be a polymer membrane (see U.S. Pat. No. 5,525,436) made of basic polymer such as polybenzimidazole or porous SiC. On the other hand, the liquid electrolyte may be liquids capable of electrically conducting hydrogen ion such as phosphoric acid, sulfuric acid, and methanesulfonic acid.

The cell unit comprises the electrolyte electrode assembly 1 which is interposed between a pair of separators (not shown).

When the fuel cell is operated, a fuel gas such as a hydrogen-containing gas is supplied to the anode 2 via a gas flow passage in the separator, and an oxygen-containing gas such as air is supplied to the cathode 3. During this process, hydrogen in the fuel gas is ionized in the electrode catalyst layer 7a of the anode 2, and thus hydrogen ions and electrons are produced.

The produced hydrogen ions are moved in the cell unit, and arrive at the electrode catalyst layer 7b of the cathode 3. During this process, the electrons are extracted by an external circuit which is electrically connected to the collectors. The electrons are utilized as DC electric energy to energize the external circuit. After that, the electrons arrive at the cathode 3. The hydrogen ions and the electrons reaching the cathode 3 react in the electrode catalyst layer 7b with the oxygen in the oxygen-containing gas supplied to the cathode 3. Thus, $H_2O$ is produced. $H_2O$ is repelled by the water-repellent layers 6a, 6b of both electrodes 2, 3, and is promptly discharged. Accordingly, it is possible to prevent the liquid electrolyte in the electrolyte layer 4 from flowing outside together with $H_2O$.

The anode 2 is produced, for example, by using a screen printing apparatus 10 shown in FIG. 9. At first, the electrode base material 5a (carbon paper or carbon cloth) is placed on a vacuum suction plate 12 through which a plurality of suction holes 11 each having a diameter of about 1 to 2 mm are provided at intervals of about 10 mm.

A suction jig 14, which is provided with a recess 13, is arranged under the vacuum suction plate 12. A tube section 15 protrudes on one side of the suction jig 14. An unillustrated suction mechanism is connected to the tube section 15. The atmospheric air around the vacuum suction plate 12 is sucked through the recess 13 by the suction mechanism. Accordingly, the vacuum suction plate 12 is positioned and fixed on the suction jig 14. Similarly, the atmospheric air around the electrode base material 5a is sucked through the suction holes 11. Accordingly, the electrode base material 5a is positioned and fixed on the vacuum suction plate 12.

A paste P1 for the water-repellent layer (see FIG. 10), which is prepared by dispersing carbon black particles and PTFE particles in a solvent such as ethylene glycol together with a surfactant, is applied onto the electrode base material 5a in this state.

Specifically, the paste P1 is supplied onto a screen 17 of a screen section 16 of a screen printing apparatus 10. Subsequently, as shown in FIG. 10, a squeegee 18 is displaced from the right end to the left end. Accordingly, the screen 17 is expanded from a frame member 19 toward the electrode base material 5a, and the paste P1 is applied onto the electrode base material 5a through the screen 17.

The paste P1 is coated on the electrode base material 5a by a predetermined thickness. The paste P1 is heated to remove the solvent by volatilization. Accordingly, the water-repellent layer 6a (see FIG. 8) is formed.

Subsequently, the electrode base material 5a, on which the water-repellent layer 6a has been formed, is positioned and fixed again on the vacuum suction plate 12 (see FIG. 9) in the same manner as described above, and a paste P2 for the electrode catalyst layer is supplied onto the screen 17. The paste P2 is prepared by dispersing carbon black particles with Pt supported thereon in a solvent such as ethylene glycol. The squeegee 18 of the screen printing apparatus 10 is displaced from the right end to the left end in the same manner as described above. Accordingly, the paste P2 is coated onto the water-repellent layer 6a through the screen 17.

Finally, the electrode base material 5a, the water-repellent layer 6a, and the paste P2 are pressed and heated. During this process, the solvent in the paste P2 is removed by vaporization. Accordingly, the electrode catalyst layer 7a (see FIG. 8) is formed. As a result, the anode 2 is completed. The cathode 3 is produced in the same manner as the anode 2.

If the water-repellent layers 6a, 6b are unnecessary, the steps of applying and drying the paste P1 are omitted. That is, the electrode catalyst layers 7a, 7b are directly formed on the electrode base materials 5a, 5b by applying the paste P2 onto the electrode base materials 5a, 5b, and then drying the paste P2.

The carbon paper or the carbon cloth used for the electrode base material 5a, 5b is a porous member having a porosity of 70 to 90%. For this reason, when the paste P1 is applied after positioning and fixing the electrode base material 5a, 5b by suction as described above, the paste P1 enters pores 20 of the electrode base material 5a, 5b as shown in FIG. 11. Therefore, a large number of depressions 21 are formed on the water-repellent layer 6a, 6b. If the paste P2 is applied and dried in this state, a large number of depressions 21 are also formed on the electrode catalyst layer 7a, 7b.

The electric charge distribution is not uniform in the electrode catalyst layer 7a, 7b having the large number of depressions 21. The conductivity of the electrodes 2, 3 of the fuel cell is lowered, and the internal resistance of the fuel cell is increased. Therefore, the output of the fuel cell is lowered, especially when current density is high.

In order to solve the problem as described above, it is considered to be effective that the electrode base materials 5a, 5b are mechanically positioned and fixed by using a fixing jig such as a clamp. However, in this procedure, a part of the electrode base materials 5a, 5b is covered with the fixing jig. Therefore, the paste P1 or the paste P2 is not applied to the part. As a result, the surface area of the electrode catalyst layers 7a, 7b in which electrochemical oxidation-reduction reaction occurs, in other words, the electrode area is decreased. Therefore, the output density based on the volume of the fuel cell is consequently lowered.

In order to avoid the decrease in output density of the fuel cell, the portion, to which the paste P1 or the paste P2 is not applied, may be trimmed. However, the number of steps is increased thereby. Therefore, it is impossible to efficiently manufacture the electrode of the fuel cell.

In any case, it is necessary to position and fix the electrode base materials 5a, 5b with the fixing jig and detach the electrode base materials 5a, 5b from the fixing jig. These operations are quite complicated and require a long period of time.

SUMMARY OF THE INVENTION

A principal object of the present invention is to provide a method of and an apparatus for producing an electrode of a fuel cell in which a substantially flat electrode catalyst layer can be formed, and thus it is possible to construct a fuel cell having a high output even at a high current density.

According to the present invention, there is provided a method of producing an electrode of a fuel cell, comprising the steps of:

holding an electrode base material by electrostatic attraction;

applying a first paste to the electrode base material; and drying the first paste to form a water-repellent layer.

In this production method, the paste for the water-repellent layer is applied while the electrode base material is held by electrostatic attraction. Therefore, during this process, the paste for the water-repellent layer is not sucked, and it does not enter pores of the electrode base material. Accordingly, it is possible to form the water-repellent layer which includes an extremely small number of depressions.

Further, a substantially flat electrode catalyst layer can be formed on the water-repellent layer. Accordingly, the electric charge distribution is substantially uniform in the electrode catalyst layer. Therefore, it is possible to obtain an electrode of the fuel cell having a high conductivity.

The fuel cell having the electrode produced as described above has a low internal resistance. Therefore, it is possible to construct the fuel cell which has a high output even when current density is high.

It is preferable that the electrode catalyst layer is formed in the same manner as the water-repellent layer. In other words, it is preferable that the method further comprises, in addition to the steps described above, the steps of:

holding the electrode base material on which the water-repellent layer is formed by the electrostatic attraction;

applying a second paste to the water-repellent layer; and drying the second paste to form an electrode catalyst layer.

When the electrode base material is held by electrostatic attraction, it is possible to form the electrode catalyst layer which includes an extremely smaller number of depressions. Therefore, it is possible to obtain an electrode of the fuel cell having a more satisfactory conductivity. Consequently, it is possible to construct the fuel cell having a higher output.

When the water-repellent layer is not provided, the electrode catalyst layer may be directly formed on the electrode base material. That is, according to another aspect of the present invention, there is provided a method of producing an electrode of a fuel cell, comprising the steps of:

holding an electrode base material by electrostatic attraction;

applying a paste to the electrode base material; and drying the paste to form an electrode catalyst layer.

Also in this case, it is possible to obtain a substantially flat electrode catalyst layer which includes a small number of depressions. Consequently, it is possible to construct the fuel cell having a higher output.

It is noted that the electrode material is usually a porous member having a porosity of 70 to 90%. Therefore, if the voltage applied to the electrodes for the electrostatic attraction is low, the electrode base material is not sufficiently held in some cases. On the other hand, if an extremely high voltage is applied, it is sometimes difficult to take out the electrode base material, because electrostatic attraction force remains even after the power source is shut off. In order to reliably avoid the inconvenience as described above, it is preferable that a material having a porosity of 70 to 90% is used as the electrode base material, and a voltage of 1000 to 6500 V is applied to the electrodes for the electrostatic attraction.

According to still another aspect of the present invention, there is provided an apparatus for producing an electrode of a fuel cell, comprising:

a mechanism for effecting electrostatic attraction; and a mechanism for applying to an electrode base material at least one of a first paste to form a water-repellent layer in the electrode of the fuel cell and a second paste to form an electrode catalyst layer in the electrode of the fuel cell, wherein the electrostatic attraction mechanism holds the electrode base material by electrostatic attraction and the paste-applying mechanism applies the paste for the water-repellent layer or the paste for the electrode catalyst layer to the electrode base material.

When the apparatus is constructed as described above, it is possible to apply the paste for the water-repellent layer while the electrode base material is held by electrostatic attraction. Therefore, it is possible to prevent the paste for the water-repellent layer from being suctioned during this process so that the paste for the water-repellent layer does not enter pores of the electrode base material. Therefore, the water-repellent layer including an extremely small number of depressions is formed. Accordingly, the electrode catalyst layer formed on the water-repellent layer is substantially flat as well. The electric charge distribution is substantially uniform in the electrode catalyst layer which is flat as described above. Therefore, it is possible to obtain the fuel cell having a low internal resistance. Consequently, it is possible to construct the fuel cell which has a high output even when the current density is high.

It is preferable that the apparatus further comprises a suction mechanism for holding by suction an electrostatic attraction plate of the electrostatic attraction mechanism. The electrostatic attraction plate holds the electrode base material. Accordingly, it is possible to position and fix (hold) the electrostatic attraction plate easily and reliably.

Preferred examples of the apparatus for producing the electrode of the fuel cell as described above may include a screen printing apparatus.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
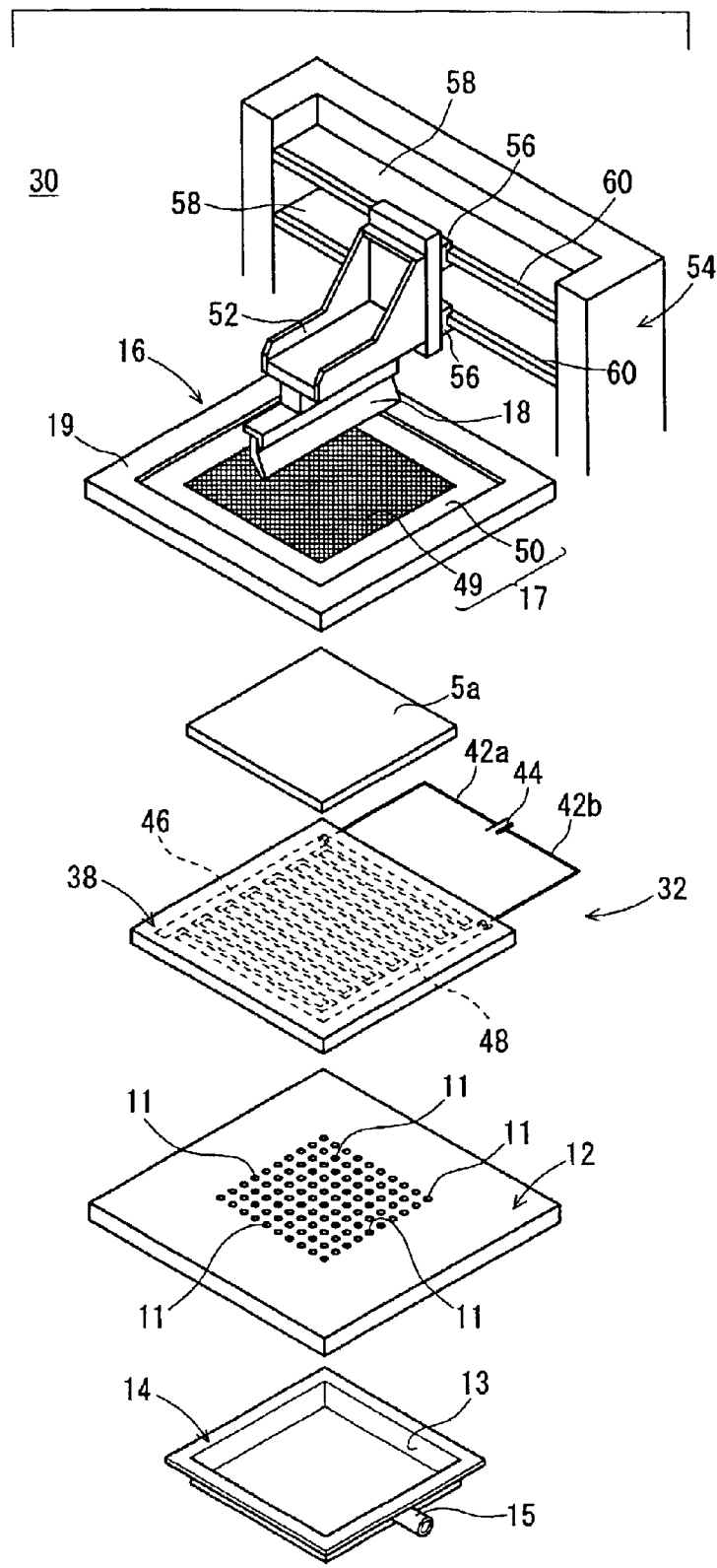
FIG. 1 is a schematic perspective view illustrating major parts of an apparatus for producing an electrode of a fuel cell (screen printing apparatus) according to an embodiment of the present invention.

A detailed explanation will be made below with reference to the accompanying drawings about the method of producing the electrode of the fuel cell according to the present invention as exemplified by preferred embodiments in relation to the apparatus for carrying out the method. In the drawings, the components that are identical to the components shown in FIGS. 8 to 11 are designated by the same reference numerals, and detailed explanation thereof will be omitted.

FIG. 1 shows a schematic perspective view illustrating major parts of an apparatus for producing an electrode of a fuel cell according to an embodiment of the present invention. An apparatus 30 for producing the electrode of the fuel cell is a screen printing apparatus comprising a suction jig 14 which is provided with a recess 13 and which has a tube section 15 protruding from one side, a vacuum suction plate 12 which is provided with a plurality of suction holes 11, an electrostatic attraction mechanism 32, a screen section 16, and a squeegee 18 which is displaceable in the right and left directions.

Figure 2:
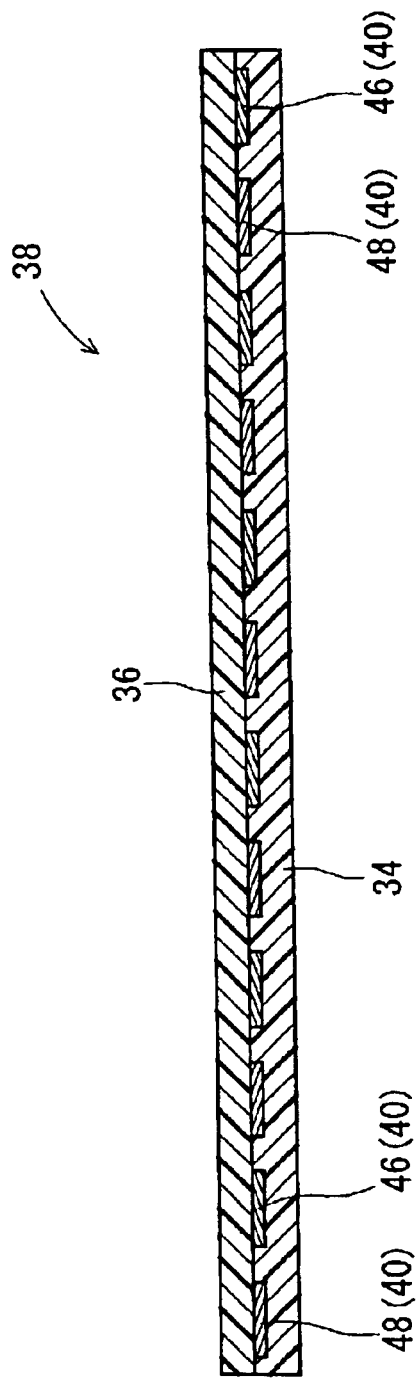
FIG. 2 is a schematic longitudinal sectional view illustrating an electrostatic attraction plate of an electrostatic attraction mechanism.
Figure 3:
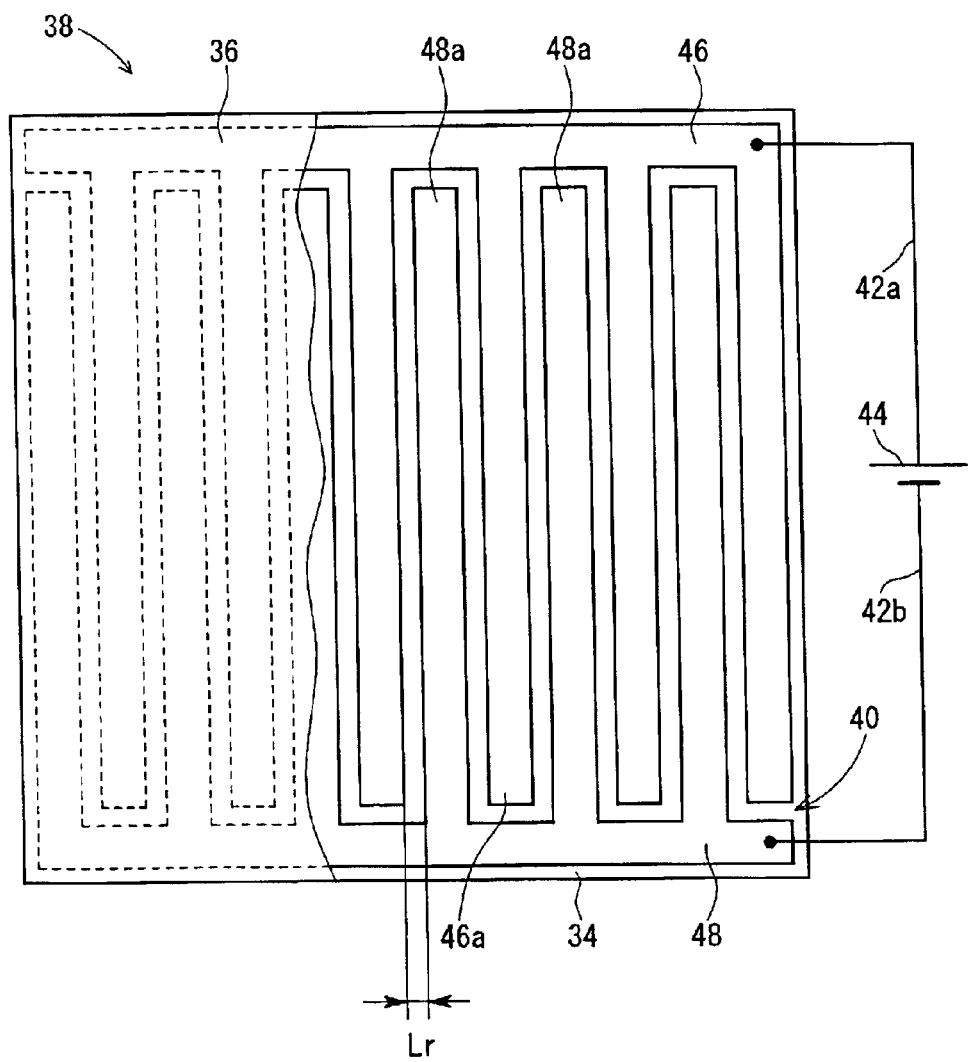
FIG. 3 is a plan view, with partial cutaway, illustrating the electrostatic attraction plate shown in FIG. 2.

Especially, as shown in FIGS. 2 and 3, the electrostatic attraction mechanism 32 includes an electrostatic attraction plate 38 which is constructed by joining a substrate 34 and a holding plate 36, and electrostatic attraction electrodes 40 which are disposed between the substrate 34 and the holding plate 36. A DC power source 44 is electrically connected to the electrostatic attraction electrodes 40 by lead wires 42a, 42b.

The substrate 34 is preferably made from a material which has a resistivity of not less than $10^{15}$ Ωcm and a dielectric constant of not more than 4. It is more preferable to use a material which has a resistivity of $10^{16}$ to $10^{17}$ Ωcm. Rigid plastic such as rigid polyvinyl chloride sheet is used for the material.

The electrostatic attraction electrode 40 comprises a comb-shaped positive electrode 46 and a negative electrode 48 (see FIG. 3). Comb teeth 46a of the positive electrode 46 are arranged between comb teeth 48a, 48a of the negative electrode 48 while being separated from each other by a distance Lr. The smaller Lr is, the larger the generated electrostatic attraction force is. However, in order to avoid any short circuit formation between the electrodes 46, 48, it is preferable that Lr is at least 5 mm. Each of the electrodes 46, 48 is formed by performing pattern printing of a conductive ink such as a silver paste or a carbon paste on the substrate 34, followed by drying.

As described above, the DC power source 44 is electrically connected to both of the electrodes 46, 48 by the lead wires 42a, 42b. More specifically, the anode of the DC power source 44 is connected to the positive electrode 46 by the lead wire 42a. On the other hand, the cathode of the DC power source 44 is connected to the negative electrode 48 by the lead wire 42b.

The holding plate 36 is preferably made from a material which has a resistivity of $10^8$ to $10^{12}$ Ωcm and a dielectric constant of 4 to 12. Such a material is exemplified by a plastic material obtained by blending a conductive powder such as carbon black with nitrile butadiene rubber, polyvinyl chloride, acrylic graft polymer, acrylonitrile, styrene resin, ABS resin, methyl methacrylate, or a mixture of two or more compounds selected from the above.

The substrate 34 and the holding plate 36 are joined to each another. Before joining, the electrostatic attraction electrodes 40 are formed on the substrate 34. Then, the holding plate 36 is placed on the substrate 34 and heated for joining to each other while being pressed.

An electrode base material 5a is positioned and fixed (held) as described later on by the electrostatic attraction mechanism 32.

The screen section 16 (see FIG. 1) has a substantially square screen 17 which comprises a mesh section 49 and a masking section 50 formed around the mesh section 49. The masking section 50 is held by a frame member 19. The frame member 19 is supported by an unillustrated support section which constitutes the apparatus 30. The mesh section 49 of the screen 17 comprises stainless yarn or polyethylene yarn having a diameter of about 50 to 70 $\mu$m woven in a lattice-shaped form. The masking section 50 closes meshes around the mesh section 49. In this arrangement, the mesh section 49 has a mesh size of 80-mesh to 250-mesh.

When the screen 17 constructed as described above is pressed by the squeegee 18, the screen 17 is easily expanded toward the holding plate 36.

The material of the squeegee 18 may be a resin material such as polyurethane. The angle formed by the surface of the squeegee 18 in the moving direction thereof (left side in FIG. 1) and the screen 17 is usually set to be 60° to 9°.

The squeegee 18 is held by a rack stand 54 with a squeegee holder 52. Two engagement clamps 56, 56 are formed to protrude on the back surface of the squeegee holder 52. On the other hand, two rack members 58, 58 are incorporated into the rack stand 54. Respective recesses of the engagement clamps 56, 56 are engaged with ends of the rack members 58, 58. In FIG. 1, reference numeral 60 indicates a reinforcement metal plate which protects each end of the rack member 58 and which facilitates the smooth movement of the squeegee 18.

The squeegee holder 52 is displaceable in the right and left in FIG. 1 by an unillustrated movement mechanism. Accordingly, the squeegee 18 is displaced together with the squeegee holder 52 while pressing the screen 17.

Next, a method of producing the electrode of the fuel cell will be explained by using the apparatus 30 constructed as described above, in which an anode 2 is produced. The anode 2 comprises a water-repellent layer 6a and an electrode catalyst layer 7a stacked in order of mention on an electrode base material 5a.

Figure 4:
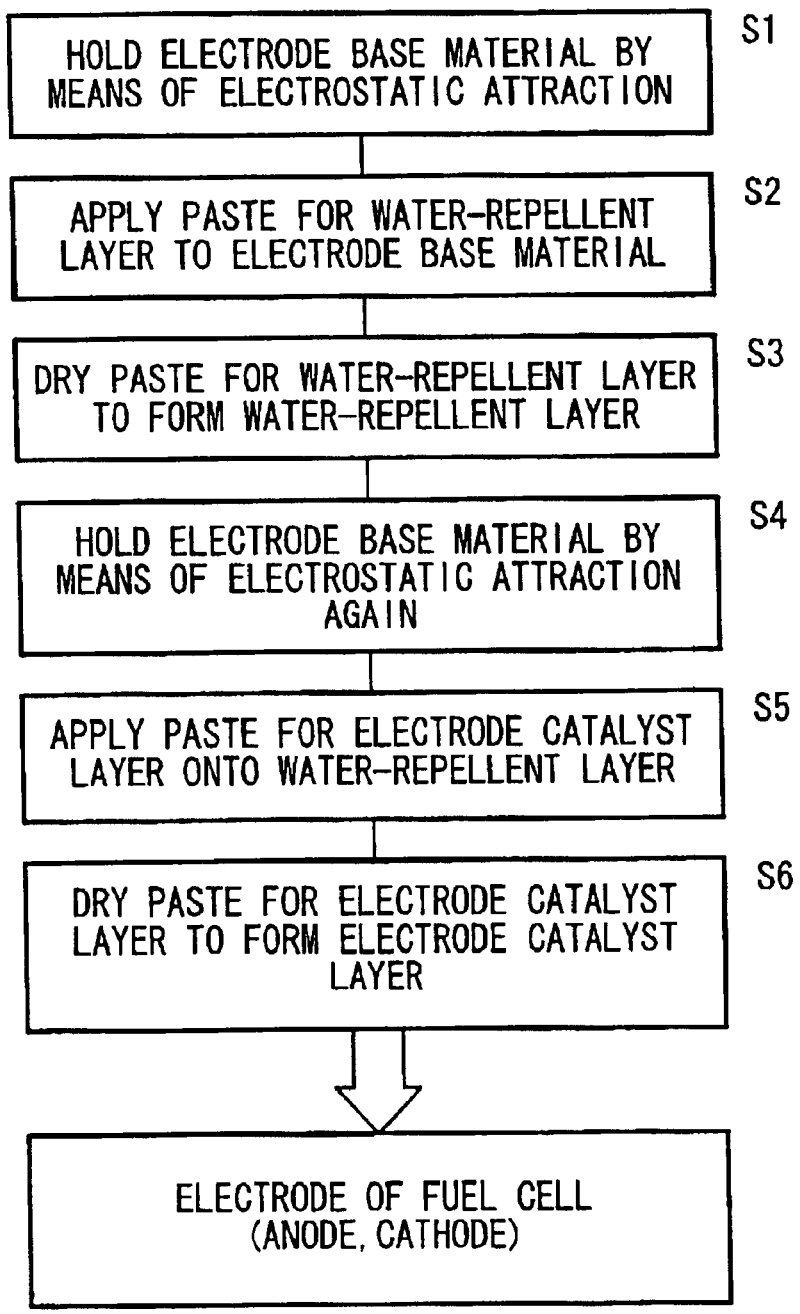
FIG. 4 shows a flow chart illustrating a method of producing the electrode of the fuel cell according to the embodiment of the present invention.

FIG. 4 shows a flow chart illustrating the method according to the embodiment of the present invention. The production method comprises a first step S1 of holding the electrode base material 5a by electrostatic attraction, a second step S2 of applying a paste P1 for the water-repellent layer onto the electrode base material 5a, a third step S3 of drying the paste P1 to form the water-repellent layer 6a, a fourth step S4 of holding the electrode base material 5a on which the water-repellent layer 6a has been formed, by electrostatic attraction again, a fifth step S5 of applying a paste P2 for the electrode catalyst layer onto the water-repellent layer 6a, and a sixth step S6 of drying the paste P2 to form the electrode catalyst layer 7a.

Before performing the first step S1, an unillustrated suction mechanism is firstly driven. Accordingly, the atmospheric air around the vacuum suction plate 12 (see FIG. 1) is sucked through the tube section 15 and the recess 13 of the suction jig 14, and thus the vacuum suction plate 12 is positioned and fixed on the suction jig 14. Further, the atmospheric air around the electrostatic attraction plate 38 is sucked through the suction holes 11 of the vacuum suction plate 12, and thus the electrostatic attraction plate 38 is positioned and fixed on the vacuum suction plate 12.

The electrode base material 5a is placed on the holding plate 36 of the positioned and fixed electrostatic attraction plate 38. In this state, a DC voltage is applied to the electrostatic attraction electrodes 40 located between the substrate 34 and the holding plate 36. Accordingly, electrostatic attraction force is generated between the pair of electrodes. As a result, the electrode base material 5a (carbon paper or carbon cloth), which is a conductor, is electrostatically attracted onto the holding plate 36.

The voltage applied to the electrostatic attraction electrodes 40 is selected depending on the porosity of the electrode base material 5a. Though the carbon which is the constitutive material of the electrode base material 5a is a conductor, the electrode base material 5a has a high electric resistance because of the large porosity of 70 to 90%. Therefore, the electrostatic attraction force exerted on the electrode base material 5a is small if the applied voltage is low, and hence it is difficult to hold the electrode base material 5a. On the other hand, if an extremely high voltage is applied, the electrostatic attraction force remains even when the DC power source 44 is shut off. In this case, it is difficult to release the electrode base material 5a applied with the paste P1 from the holding plate 36. The applied voltage is preferably 1000 to 6500 V and more preferably 4000 to 6200 V so that the electrode base material 5a is reliably held and the electrode base material 5a is easily released from the holding plate 36 after shutting off the DC power source 44. For example, if the electrode base material 5a of carbon paper having a porosity of about 80% is used, the applied voltage may be 6000 V.

The paste P1 is supplied to the mesh section 49 of the screen 17 which is arranged over the electrode base material 5a at a position within a range of 1 to 6 mm from the electrode base material 5a, for example, at a position separated therefrom by about 2 mm.

The paste P1 can be prepared, for example, by dispersing particles of a water-repellent substance such as PTFE, particles of a conductive substance such as carbon black, and a surfactant in an organic solvent such as isopropanol, normal propanol, or ethylene glycol.

It is preferable that the ratio between the organic solvent and the respective particles in the paste P1 is selected so that the viscosity of the paste P1 is 100 to 30000 cps. If the viscosity is less than 100 cps, an obtained paste tends to flow, and hence the paste P1 easily outflows from the electrode base material 5a. On the other hand, if the viscosity exceeds 30000 cps, then the fluidity of the paste P1 is insufficient, and hence it is difficult to apply an obtained paste. The rate of the organic solvent is preferably 40 to 90% by weight so that the viscosity of the paste P1 is 100 to 30000 cps.

The paste P1 is exemplified by a paste in which 49.5 parts by weight PTFE dispersion containing 60.6% by weight PTFE particles (particle size: 200 to 300 nm), 5% by weight surfactant, and 34.4% by weight pure water are mixed with 70 parts by weight carbon black particles having particle sizes of 10 to 30 nm and 840 parts by weight ethylene glycol, and an obtained viscosity is 20000 cps.

Figure 5:
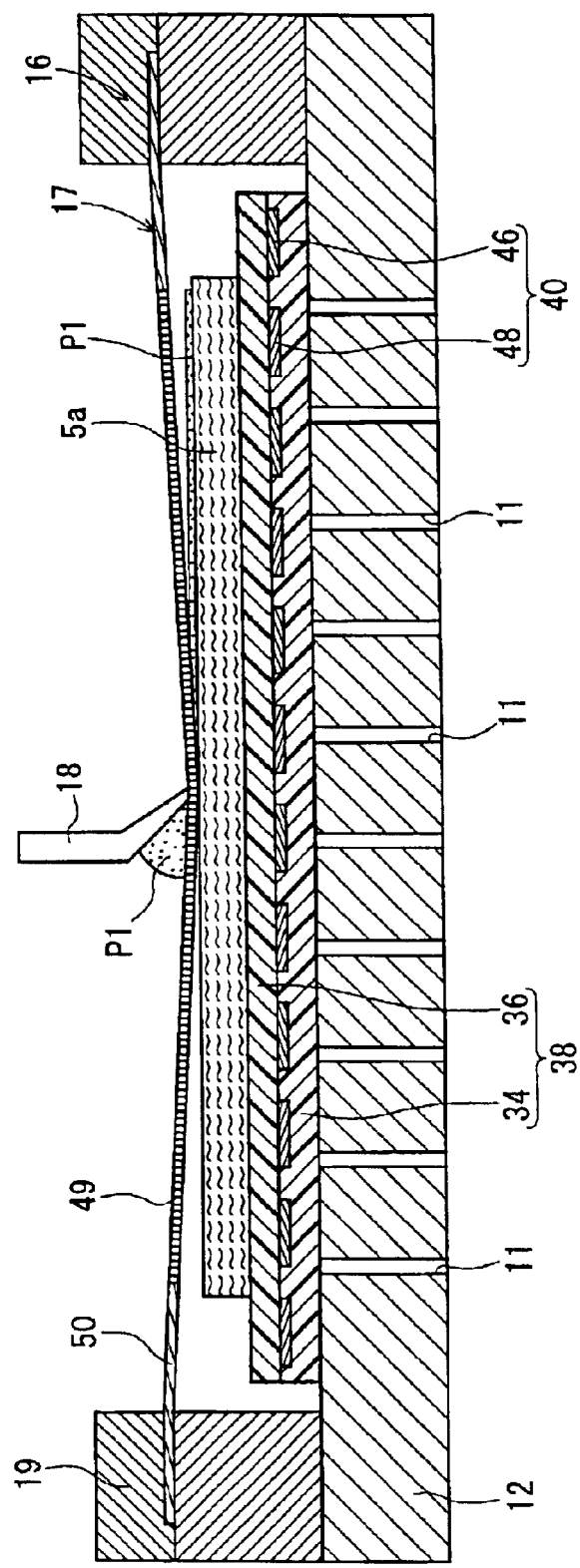
FIG. 5 is a magnified sectional view of major parts illustrating a state in which a paste for a water-repellent layer is applied with the apparatus shown in FIG. 1.

Subsequently, in the second step S2, the paste P1 is applied to the electrode base material 5a. That is, the squeegee holder 52 is displaced together with the squeegee 18 by the unillustrated movement mechanism. In accordance with the displacement, the mesh section 49 of the screen 17 is expanded to a position in the vicinity of the surface of the electrode base material 5a, by being pressed by the end of the squeegee 18 as shown in a magnified view in FIG. 5. Further, the paste P1 is applied to the electrode base material 5a through the mesh section 49. When the viscosity of the paste P1 is within the range as described above, it is preferable that the movement speed of the squeegee 18 is 250 to 350 mm/second. When the movement speed is within the range as described above, the paste P1 can be applied to have a substantially uniform thickness on the electrode base material 5a.

The paste P1 may be applied twice or more times. For example, when the water-repellent layer 6a is formed so that 2.5 mg of the carbon black particles and 1.1 mg of the PTFE particles are included in 1 cm² within a central area of 155 mm×225 mm of the electrode base material 5a having a short side of 160 mm and a long side of 230 mm, the following procedure may be adopted. The paste P1 is applied four times under a condition of the movement speed of the squeegee 18 of 300 mm/second, and the amount of application for each time is 4.3 g, 2.9 g, 2.4 g, and 2.4 g.

The electrode base material 5a is not directly sucked by the suction mechanism during the period in which the paste P1 is applied to the electrode base material 5a as described above, for the following reason. The substrate 34 and the holding plate 36 are located between the vacuum suction plate 12 and the electrode base material 5a. Accordingly, the paste P1 does not enter the pores 20 (see FIG. 11) of the electrode base material 5a. Consequently, it is possible to obtain the water-repellent layer 6a which includes an extremely small number of depressions 21.

After the paste P1 is applied to the electrode base material 5a, the DC power source 44 (see FIGS. 1 and 3) is shut off to stop the electrostatic attraction. When the applied voltage is within the range described above, the electrode base material 5a can be easily released from the holding plate 36.

Subsequently, in the third step S3, the water-repellent layer 6a is formed by drying the paste P1. The drying operation may be performed by natural drying or drying in air. However, it is preferable to perform a heating treatment for the following reason. When the heating treatment is performed, the paste P1 is dried in a short period of time, and hence it is possible to efficiently obtain the electrode of the fuel cell. In the heating treatment, for example, the temperature may be raised to about 380° C. and maintained for about 30 minutes. The paste P1 may be pressurized while being heated.

The electrode catalyst layer 7a stacked on the water-repellent layer 6a can be formed by performing the fourth step S4 to the sixth step S6 in accordance with the first step S1 to the third step S3. That is, the electrostatic attraction plate 38 is held on the vacuum suction plate 12 by suction of the suction mechanism. After that, a voltage, which is preferably 1000 to 6500 V and more preferably 4000 to 6200 V, is applied to the electrodes for electrostatically holding the electrode base material 5a. The paste P2 is supplied to the mesh section 49 of the screen 17 which is arranged over the electrode base material 5a while being separated therefrom by about 1 to 6 mm.

The paste P2 is prepared, for example, by dispersing carbon black particles with Pt supported thereon in a solvent such as ethylene glycol. In order to add the water-repellent property, particles of, for example, PTFE may be dispersed together. When the electrolyte layer 4 positioned between the anode 2 and the cathode 3 is made from a solid polymer such as perfluorocarbon sulfonic acid resin, it is preferable that powder of perfluorocarbon sulfonic acid resin is added to the paste P2. The preferred viscosity of the paste P2 and the ratio of the organic solvent are equivalent to those of the paste P1.

A specified example of the paste P2 may be a paste in which 25 parts by weight catalyst-supporting particles including 10 parts by weight Pt particles supported on 15 parts by weight carbon black (particle size: 25 to 35 nm), 1.5 part by weight PTFE particles having particle sizes of 0.25 to 0.3 μm, and 120 parts by weight ethylene glycol are mixed, and an obtained viscosity is 300 cps.

Figure 6:
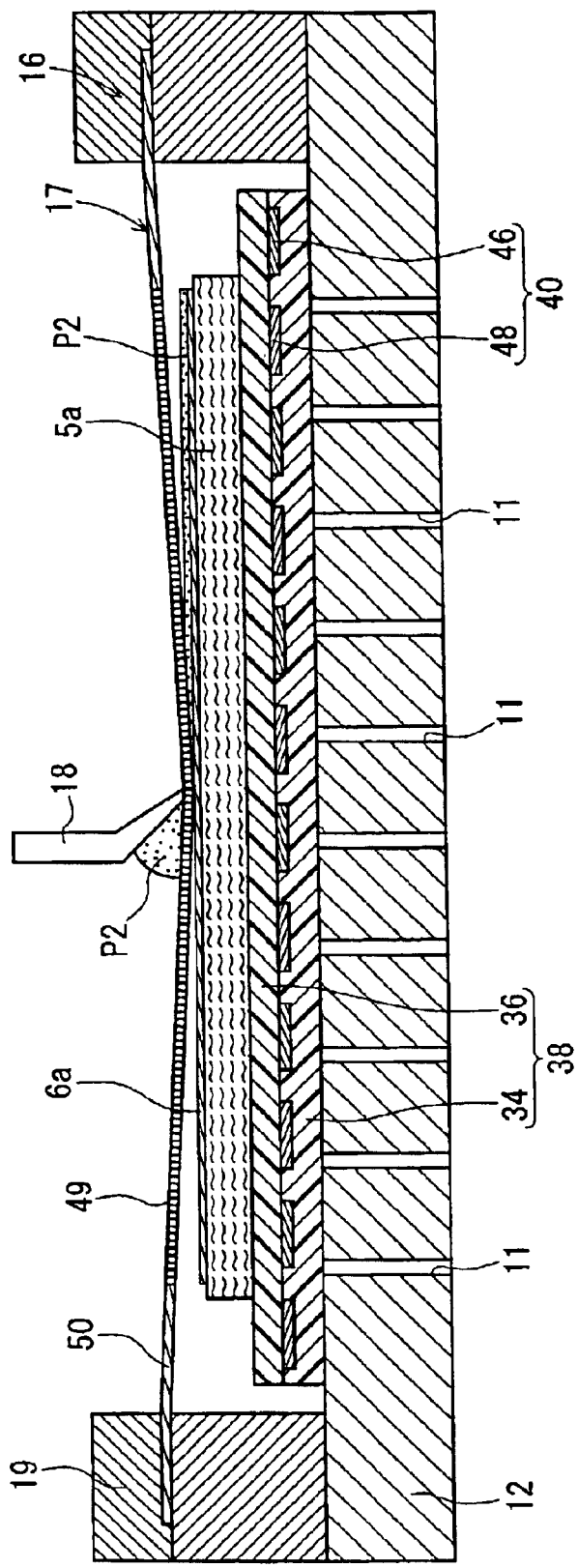
FIG. 6 is a magnified sectional view of major parts illustrating a state in which a paste P2 for an electrode catalyst layer is applied.

Subsequently, in the fourth step S4, the paste P2 is applied onto the water-repellent layer 6a as shown in a magnified view in FIG. 6 in the same manner as in the second step described above. The preferred movement speed of the squeegee 18 is 250 to 350 mm/second in the same manner as described above.

Also in this case, the paste P2 may be applied twice or more times. For example, when the electrode catalyst layer 7a is formed so that 1.5 mg of the catalyst-supporting particles is included in 1 cm² within a central area of 155 mm×225 mm of the electrode base material 5a having a short side of 160 mm and a long side of 230 mm, the following procedure may be adopted. The paste P2 is applied four times under a condition of the movement speed of the squeegee 18 of 300 mm/second, and the amount of application for each of the first to third times is 0.78 g and the amount of application for the fourth time is 0.72 g.

The paste P2 does not enter the pores 20 of the electrode base material 5a (see FIG. 11) during the application since the electrode base material 5a is not directly sucked by the suction mechanism as described above. Further, the water-repellent layer 6a on the electrode catalyst layer 7a includes an extremely small number of depressions 21. Accordingly, it is possible to obtain the electrode catalyst layer 7a which is substantially flat and which includes an extremely small number of depressions 21.

After the paste P2 is applied to the electrode base material 5a, the DC power source 44 (see FIG. 1) is shut off to stop the electrostatic attraction. When the applied voltage is within the range as described above, the electrode base material 5a can be easily released from the holding plate 36.

Subsequently, in the sixth step S6, the paste P2 is dried by natural drying or drying in air, preferably by a heating treatment to form the electrode catalyst layer 7a. The heating treatment may be performed, for example, under a condition in which the temperature is about 120° C. and the holding time is about 30 minutes. Further, a pressurizing operation may be performed in addition to the heating treatment.

When the electrode catalyst layer 7a is provided as described above, the anode 2 (see FIG. 8) is obtained, in which the water-repellent layer 6a and the electrode catalyst layer 7a are stacked in order of mention on the electrode base material 5a.

As described above, in the embodiment of the present invention, the electrode base material 5a is held by electrostatic attraction. Accordingly, the paste P1 and the paste P2 do not enter the pores 20 of the electrode base material 5a (see FIG. 11). Therefore, it is possible to obtain the electrode of the fuel cell formed with the water-repellent layer 6a and the electrode catalyst layer 7a which include an extremely small number of depressions 21.

Further, in this case, it is unnecessary to mechanically hold the electrode base material 5a by using any fixing jig such as a clamp. Accordingly, it is possible to apply the paste P1 and/or the paste P2 to the entire surface of the electrode base material 5a by a desired area. Therefore, the electrode area is not decreased, and hence the output density in a unit volume of the fuel cell is not lowered as well.

When the fuel cell is constructed by using the electrode manufactured as described above, electric charge distribution is substantially uniform in the electrode. Further, in this case, it is unnecessary to mechanically hold the electrode base material 5a by using any fixing jig. Therefore, there is no portion to which no paste is applied. In other words, it is possible to increase the electrode area. For the reason as described above, the conductivity of the electrode of the fuel cell is increased. Accordingly, the internal resistance of the fuel cell is decreased. Therefore, it is possible to construct the fuel cell in which the output is high even at a high current density.

The embodiment described above has been explained by using the case in which the anode 2 is produced. However, the cathode 3 (see FIG. 8) can also be produced by forming a water-repellent layer 6b and an electrode catalyst layer 7b in order of mention on an electrode base material 5b in the same manner as described above.

Figure 7:
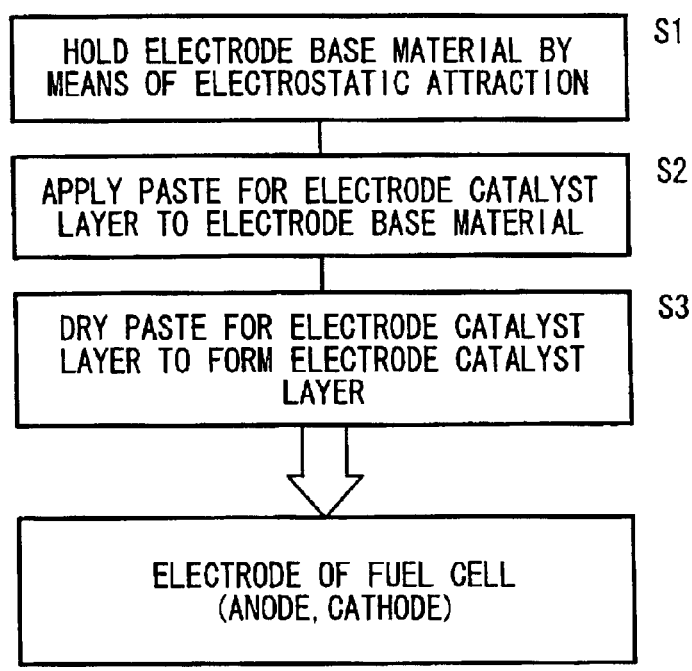
FIG. 7 shows a flow chart illustrating a method of producing an electrode of a fuel cell according to another embodiment.
Figure 8:
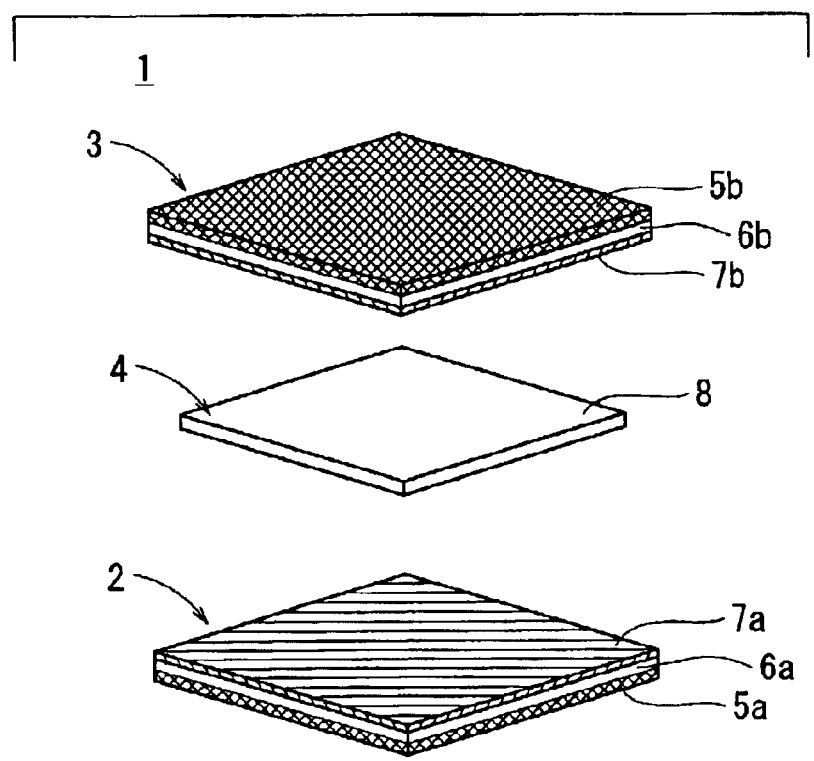
FIG. 8 is a schematic perspective view illustrating an electrolyte electrode assembly which constitutes a cell unit of the fuel cell.
Figure 9:
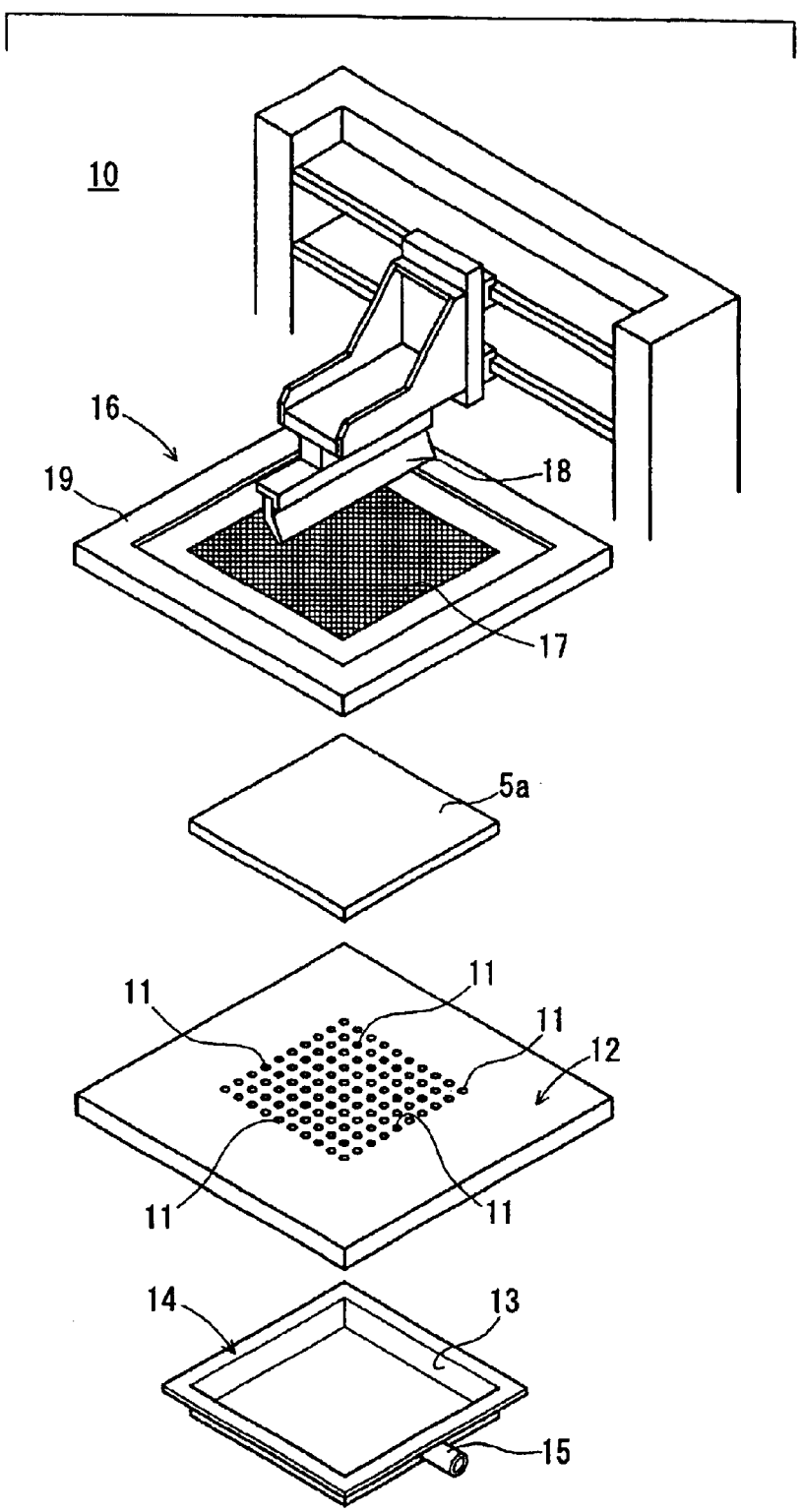
FIG. 9 is a schematic perspective view illustrating major parts of an apparatus for producing an electrode of a fuel cell (screen printing apparatus) concerning the conventional technique.
Figure 10:
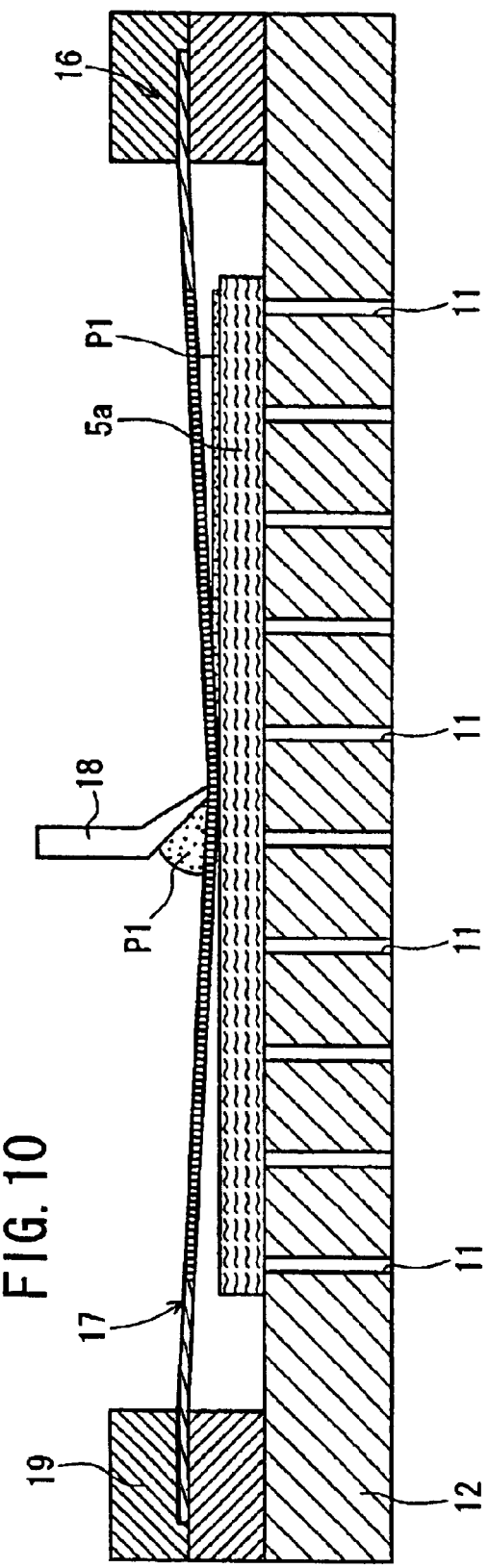
FIG. 10 is a magnified sectional view of major parts illustrating a state in which a paste for a water-repellent layer is applied with the apparatus shown in FIG. 9.
Figure 11:
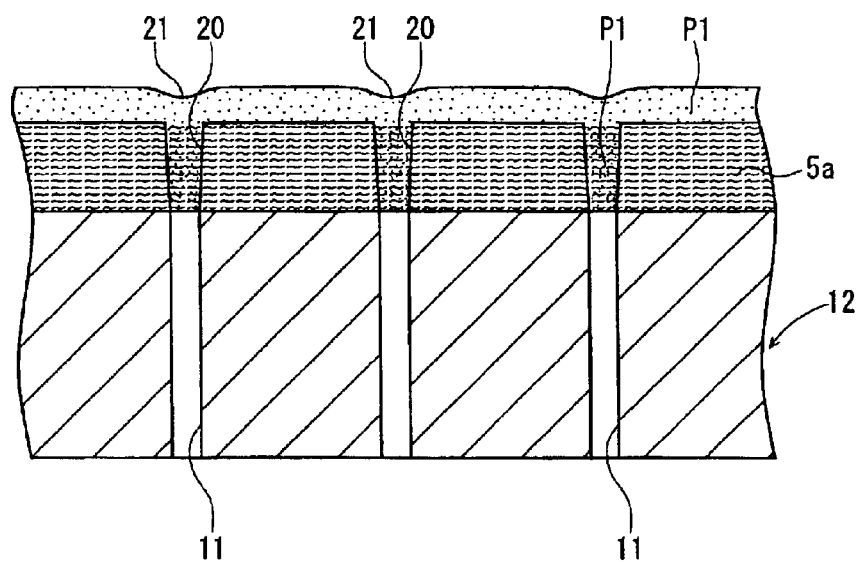
FIG. 11 is a magnified sectional view of major parts illustrating a state in which the paste for the water-repellent layer enters pores of an electrode base material.

The embodiment described above has been explained by using the case in which both of the water-repellent layer 6a and the electrode catalyst layer 7a are formed. However, an electrode of a fuel cell having no water-repellent layer 6a, 6b may be produced by directly providing an electrode catalyst layer 7a, 7b on an electrode base material 5a, 5b in accordance with a production method based on a flow chart shown in FIG. 7. Also in this case, it is possible to extremely decrease the number of depressions 21 on the electrode catalyst layer 7a, 7b.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of producing an electrode of a fuel cell, comprising the steps of:
   holding an electrode base material by electrostatic attraction;
   applying a first paste to said electrode base material; and
   drying said first paste to form a water-repellent layer.

2. The method according to claim 1, further comprising the steps of:
   holding said electrode base material on which said water-repellent layer is formed by said electrostatic attraction;
   applying a second paste to said water-repellent layer; and
   drying said second paste to form an electrode catalyst layer.

3. The method according to claim 1, wherein a material having a porosity of 70 to 90% is used as said electrode base material, and a voltage of 1000 to 6500 V is applied to electrodes for said electrostatic attraction.

4. The method according to claim 2, wherein a material having a porosity of 70 to 90% is used as said electrode base material, and a voltage of 1000 to 6500 V is applied to electrodes for said electrostatic attraction.

5. A method of producing an electrode of a fuel cell, comprising the steps of:
   holding an electrode base material by electrostatic attraction;
   applying a paste to said electrode base material; and
   drying said paste to form an electrode catalyst layer.

6. The method according to claim 5, wherein a material having a porosity of 70 to 90% is used as said electrode base material, and a voltage of 1000 to 6500 V is applied to electrodes for said electrostatic attraction.

7. A method of producing an electrode of a fuel cell, comprising the steps of:
   holding an electrostatic attraction plate by suction; holding an electrode base material on said electrostatic attraction plate by electrostatic attraction generated by applying voltage to electrodes;
   applying a first paste to said electrode base material; and
   drying said first paste to form a water-repellent layer.

8. The method according to claim 7, wherein carbon paper or carbon cloth having a porosity of 70 to 90% is used as said electrode base material, and voltage of 1000 to 6500 V is applied to said electrodes for electrostatic attraction.

9. The method according to claim 7, further comprising the steps of:
   applying a second paste to said water-repellent layer while said electrostatic attraction plate is held by suction and said electrode base material is held by electrostatic attraction; and
   drying said second paste to form an electrode catalyst layer.

10. A method of producing an electrode of a fuel cell, comprising the steps of:
    holding an electrostatic attraction plate by suction;
    holding an electrode base material on said electrostatic attraction plate by electrostatic attraction generated by applying voltage to electrodes;
    applying a paste to said electrode base material; and
    drying said paste to form an electrode catalyst layer.

11. The method according to claim 10, wherein carbon paper or carbon cloth having a porosity of 70 to 90% is used as said electrode base material, and a voltage of 1000 to 6500 V is applied to said electrodes for electrostatic attraction.

* * * * *